(12) United States Patent
Mazurenko et al.

(10) Patent No.: US 8,515,055 B2
(45) Date of Patent: Aug. 20, 2013

(54) ADAPTIVE FILTERING WITH FLEXIBLE SELECTION OF ALGORITHM COMPLEXITY AND PERFORMANCE

(75) Inventors: Ivan Leonidovich Mazurenko, Khimki (RU); Stanislav Vladimirovich Aleshin, Moscow (RU); Dmitry Nikolaevich Babin, Moscow (RU); Ilya Viktorovich Lyalin, Moscow (RU); Andrey Anatolevich Nikitin, Moscow (RU); Denis Vassilevich Parfenov, Moscow (RU)

(73) Assignee: LSI Corporation, San Jose, CA (US)

( * ) Notice: Subject to any disclaimer, the term of this patent is extended or adjusted under 35 U.S.C. 154(b) by 1016 days.

(21) Appl. No.: 12/530,269

(22) PCT Filed: Oct. 31, 2008

(86) PCT No.: PCT/RU2008/000681
§ 371 (c)(1),
(2), (4) Date: Sep. 8, 2009

(87) PCT Pub. No.: WO2010/050841
PCT Pub. Date: May 6, 2010

(65) Prior Publication Data
US 2011/0033037 A1 Feb. 10, 2011

(51) Int. Cl.
*H04M 9/08* (2006.01)
*H04B 3/20* (2006.01)
*H04B 1/38* (2006.01)
(52) U.S. Cl.
USPC ...................... 379/406.09; 370/290; 455/570
(58) Field of Classification Search
None
See application file for complete search history.

(56) References Cited

U.S. PATENT DOCUMENTS

| 5,428,562 A | 6/1995 | Gay | |
|---|---|---|---|
| 5,721,923 A * | 2/1998 | Hamilton | ...................... 718/104 |
| 6,137,881 A | 10/2000 | Oh et al. | |

(Continued)

FOREIGN PATENT DOCUMENTS
EP 1117191 A 7/2001

OTHER PUBLICATIONS

S.L. Gay, et al., "The Fast Affine Projection Algorithm," Proceedings of the International Conference on Acoustics, Speech, and Signal Processing (ICASSP), Detroit, Michigan, USA, ISBN: 978-0-7803-2431-2, XP010151981, vol. 5, May 9, 1995, pp. 3023-3026.

(Continued)

*Primary Examiner* — Simon Sing
*Assistant Examiner* — Jeffrey Lytle
(74) *Attorney, Agent, or Firm* — Mendelsohn, Drucker & Dunleavy, P.C.; Yuri Gruzdkov; Steve Mendelsohn

(57) ABSTRACT

An adaptive filter configured to use multiple algorithm species that differ in the quality of echo suppression and respective burdens imposed on the computational resources of the host communication device. Depending on the available computational budget, the adaptive filter selects an algorithm species that, while supporting a relatively high quality of echo suppression, involves a relatively low risk of overwhelming the computational resources. The adaptive filter monitors changes in the available computational budget and, if appropriate or necessary, can change the algorithm species to maintain a quality of echo suppression that is optimal for the current computational budget. If a change of the algorithm species is initiated, then at least a portion of internal algorithm data from the previously running algorithm species might be transferred for use in the subsequent algorithm species.

12 Claims, 3 Drawing Sheets

(56) References Cited

U.S. PATENT DOCUMENTS

| | | | |
|---|---|---|---|
| 6,381,272 B1* | 4/2002 | Ali | 375/233 |
| 6,408,023 B1* | 6/2002 | Abdesselem et al. | 375/232 |
| 2004/0030736 A1* | 2/2004 | Scheuermann | 708/402 |
| 2006/0039458 A1* | 2/2006 | Ding | 375/232 |
| 2007/0041575 A1* | 2/2007 | Alves et al. | 379/406.08 |
| 2009/0123002 A1* | 5/2009 | Karthik et al. | 381/66 |

OTHER PUBLICATIONS

S. Oh, et al., "A Fast Affine Projection Algorithm for an Acoustic Echo Cancellation Using a Fixed-Point DSP Processor," Proc. ICASSP, Apr. 1997, pp. 4121-4124.

H. Ding, "Fast Affine Projection Adaptation Algorithms Featuring Stable Symmetric Positive-Definite Linear System Solvers," IEEE Transactions on Signal Processing, 2007, vol. 55, No. 5, pp. 166-169.

F.G. Resende, et al., "AR Spectral Estimation Based on Multi-Window Analysis of the Linear Prediction Error," IEEE, 1997, pp. 119-122.

M. Tanaka, et al., "Fast Projection Algorithm and Its Step Size Control," IEEE, 1995, pp. 945-948.

John M. Cloth, et al., "Fast, Recursive-Least-Squares Transversal Filters for Adaptive Filtering," IEEE Transactions on Acoustics, Speech, and Signal Processing, vol. ASSP-32, No. 2, Apr. 1984, pp. 304-337.

* cited by examiner

100

210

300

ADAPTIVE FILTERING WITH FLEXIBLE SELECTION OF ALGORITHM COMPLEXITY AND PERFORMANCE

BACKGROUND OF THE INVENTION

1. Field of the Invention

The present invention generally relates to adaptive filtering and, more specifically, to echo-suppression algorithms.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Echo cancellation is a process of removing echo from a communication signal. Echo can appear, e.g., due to the use of hybrids and/or speech compression techniques and due to packet processing delays. In voice communications, echo cancellation can advantageously improve call quality and reduce bandwidth requirements.

Echo cancellers use adaptive filters because the exact acoustic and/or network environment, in which the host communication device operates, is not known a priori. Filter adjustment is thus used to enable the host communication device to perform reasonably well in a variety of environments. There exist a large number of algorithms for adaptively adjusting filter parameters, which algorithms differ in dimensionality, computational complexity, convergence speed, stability, etc. In general, relatively complex algorithms provide relatively high quality of echo suppression, but impose a relatively heavy burden on the computational resources of the host communication device. On the other hand, the quality of echo suppression achieved through the use of relatively simple algorithms might not be optimal or even acceptable.

SUMMARY OF THE INVENTION

Problems in the prior art are addressed by various embodiments of an adaptive filter configured to use multiple algorithm species that differ in the quality of echo suppression and respective burdens imposed on the computational resources of the host communication device. Depending on the available computational budget, the adaptive filter selects an algorithm species that, while supporting a relatively high quality of echo suppression, involves a relatively low risk of overwhelming the computational resources. The adaptive filter monitors changes in the available computational budget and, if appropriate or necessary, can change the algorithm species to maintain a quality of echo suppression that is optimal for the current computational budget. If a change of the algorithm species is initiated, then at least a portion of internal algorithm data from the previously running algorithm species might be transferred for use in the subsequent algorithm species. The adaptive filter also runs an error-monitoring routine that enables early detection of an impending algorithm crash. Using a warning generated by the error-monitoring routine, the adaptive filter performs a soft restart in which a significant portion of internal algorithm data can be recycled, thereby saving substantial computational resources that would otherwise be spent to recalculate the same after a crash.

According to one embodiment, the present invention is a device comprising an algorithm module and a selector module operatively coupled to the algorithm module. The algorithm module has a plurality of algorithm species, each adapted to suppress echo in a communication signal. The selector module is adapted to select a first algorithm species from said plurality based on an available computational budget; and further adapted to configure the algorithm module to run the first algorithm species to perform said echo suppression.

According to another embodiment, the present invention is a method of adaptive filtering comprising the steps of: (A) based on an available computational budget, selecting a first algorithm species from a plurality of algorithm species, each adapted to suppress echo in a communication signal of a communication device; and (B) configuring the communication device to run the first algorithm species to perform said echo suppression.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1:
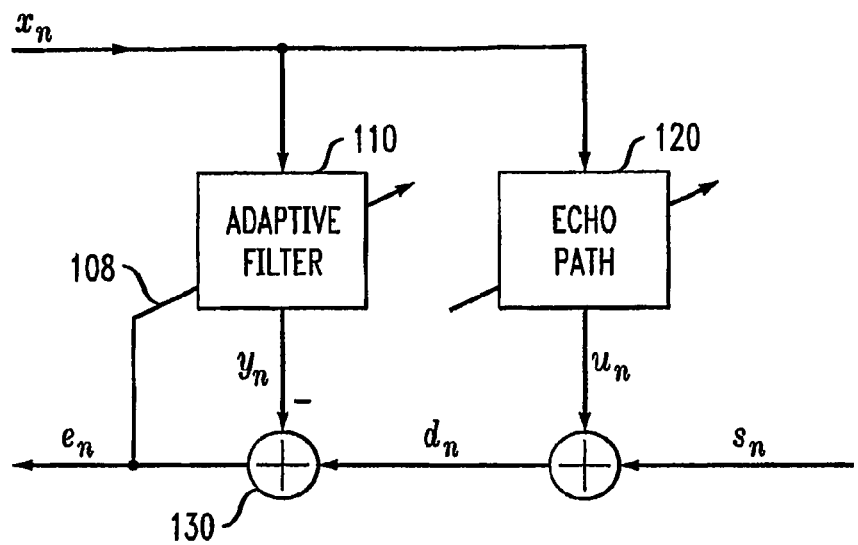
FIG. 1 shows a simplified block diagram of a portion of a communication system according to one embodiment of the invention.

FIG. 1 shows a simplified block diagram of a portion of a communication system 100 according to one embodiment of the invention. System 100 has an adaptive filter 110 receiving a digitally sampled input signal, $x_n$, where n is the time index. System 100 further has an echo path 120 that produces an unwanted signal, $u_n$, which is an echo of the input signal. A wanted signal, $s_n$, generated in system 100 is distorted by superimposed unwanted signal $u_n$ to become a perceived signal, $d_n$. An echo estimate, $y_n$, generated by adaptive filter 110 is subtracted in an adder 130 from perceived signal $d_n$ to generate an output signal, $e_n$. The parameters of adaptive filter 110 are selected so that the impulse response of the filter approximates that of echo path 120 to cause echo estimate $y_n$ to substantially cancel unwanted signal $u_n$ in output signal $e_n$. Since the characteristics of echo path 120 can vary over time, the parameters of adaptive filter 110 are continuously updated, using a feedback path 108, to maintain an acceptable quality of echo suppression.

Figure 2:
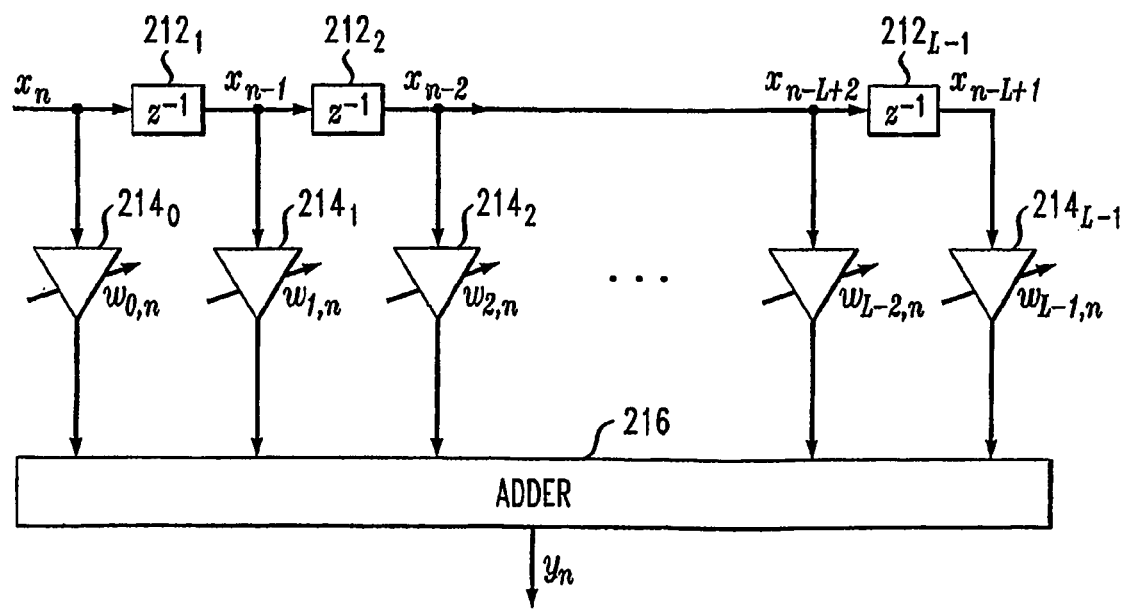
FIG. 2 shows a block diagram of an adaptive filter that can be used in the communication system of FIG. 1 according to one embodiment of the invention.

FIG. 2 shows a block diagram of an adaptive filter 210 that can be used as adaptive filter 110 according to one embodiment of the invention. Adaptive filter 210 has L−1 delay elements 212 coupled to L scaling blocks 214, where L is an integer greater than 1. Delay element $212_1$ and scaling block $214_0$ receive input signal $x_n$. Scaling block $214_i$ receives, as an input, the output of delay element $212_i$, where $1 \leq i \leq L-1$. Each scaling block 214 scales its input signal by applying a corresponding weighting coefficient $w_{j,n}$, where $0 \leq j \leq L-1$. The weighting coefficients can be adjusted, e.g., as described in more detail below. An adder 216 sums the outputs of scaling blocks 214 to produce echo estimate $y_n$.

In mathematical terms, adaptive filter 210 performs a multiplication of a transposed excitation vector $(x_n, x_{n-1}, \ldots$ $x_{n-L+1}$) and an adaptive tap-weight vector ($w_{0,n}$, $w_{1,n}$, . . . $w_{L-1,n}$). The excitation vector changes over time and can be used to construct an N-dimensional excitation matrix, where N is a positive integer. The excitation matrix is a rectangular matrix of size L×N having N consecutive transposed excitation vectors as its columns. An adaptive-filtering algorithm that operates on such an excitation matrix is usually referred to as having the N-th projection order or being N-dimensional. The structure of adaptive filter 210 corresponds to a one-dimensional adaptive-filtering algorithm. One skilled in the art will appreciate that an adaptive filter based on an N-dimensional (where N>1) adaptive-filtering algorithm might have a structure that is different from that of adaptive filter 210. In general, an adaptive filter analogous to adaptive filter 210 can be implemented as a program running on a digital signal processor (DSP) or as an application specific integrated circuit (ASIC).

Figure 3:
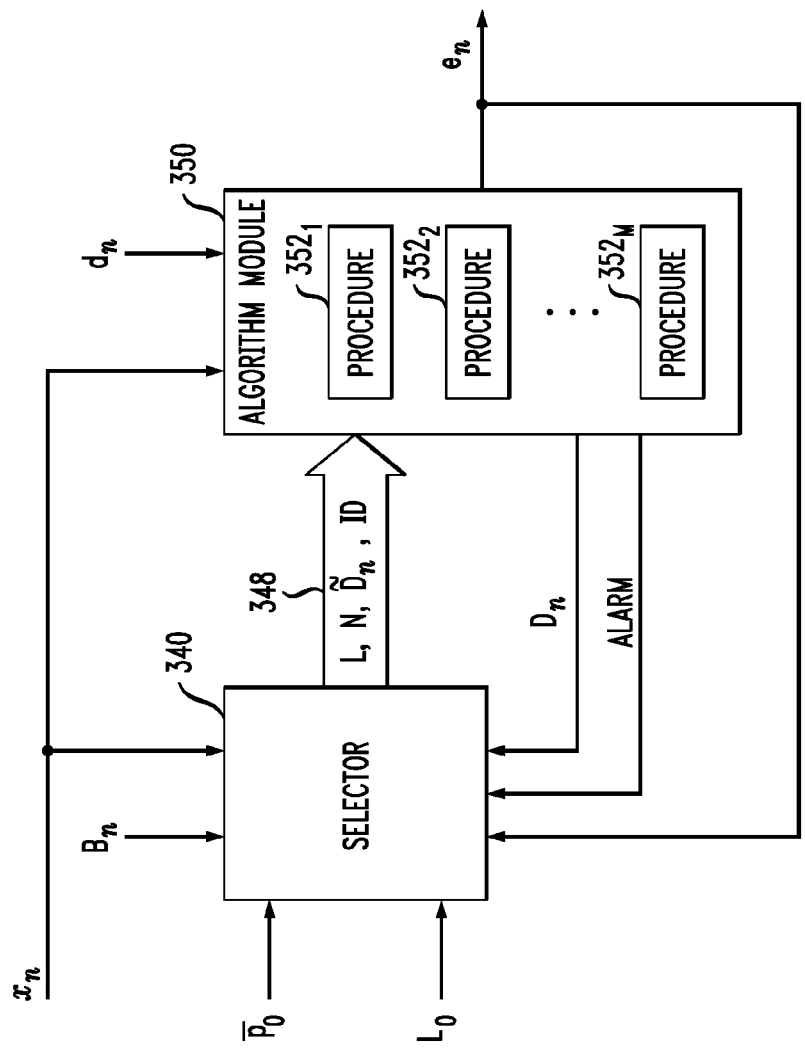
FIG. 3 shows a block diagram of an adaptive filter that can be used in the communication system of FIG. 1 according to another embodiment of the invention.

FIG. 3 shows a block diagram of an adaptive filter 300 that can be used in communication system 100 according to another embodiment of the invention. More specifically, adaptive filter 300 is intended to replace both adaptive filter 110 and adder 130. Adaptive filter 300 has a selector module 340 operatively coupled to an algorithm module 350. Algorithm module 350 receives input signal $x_n$ and perceived signal $d_n$ and processes these signals to generate output signal $e_n$ (see also FIG. 1). The type of processing to which signals $x_n$ and $d_n$ are subjected in algorithm module 350 is controlled, via a control signal 348, by selector module 340. In one embodiment, control signal 348 specifies one or more of the following: (i) number of taps L; (ii) projection order N; (iii) a set of initialization and/or restart data and parameters, $\tilde{D}_n$; and (iv) an algorithm or algorithm-species identification, ID. Based on control signal 348, algorithm module 350 calls one of procedures $352_1$-$352_M$. The called procedure is then used to process signals $x_n$ and $d_n$ and generate output signal $e_n$.

As used herein, the term "algorithm" means a well-defined, step-by-step computational procedure directed at reducing, in a finite number of steps, the contribution of echo in output signal $e_n$. Different algorithms generally represent different methods of solving an underlying mathematical problem. Different algorithms may also differ in the definitions of their underlying mathematical problems, even though they all share the same goal (i.e., echo suppression). Each algorithm is generally embodied by a plurality of "algorithm species," which are characterized by different values of L and/or N. While different species of an algorithm share the same general method of solving the underlying mathematical problem, the dimensions of the operational mathematical objects (e.g., the excitation matrix, adaptive tap-weight vector, etc.) might be different for different species. As a result, different species of the same algorithm generally consume different amounts of computational power (typically measured in millions of instructions per second, MIPS). Each of procedures $352_1$-$352_M$ in algorithm module 350 generally represents a different species of one or more different algorithms.

In a representative embodiment, adaptive filter 300 relies on computational resources (e.g., the CPU) of the host device. Depending on the tasks that are being run by the host device, the total MIPS budget that is allocated to adaptive filter 300 can vary over time. For example, if the level of CPU usage by other tasks is relatively low, then a relatively large portion of the CPU power is available for allocation to adaptive filter 300. On the other hand, if the level of CPU usage by other tasks is relatively high, then a relatively small portion of the CPU power is available for allocation to adaptive filter 300. In a typical host device, the MIPS budgets that can be allocated to different communication channels depend primarily on the overall traffic load, e.g., the number of active communication channels, and the peak computational requirements for each of the channels.

As already indicated in the background section, generally, there is a direct correlation between the complexity of the algorithm and the resulting quality of echo suppression. On one hand, relatively complex algorithms, while capable of providing relatively high quality of echo suppression, run a substantial risk of overwhelming the computational resources of the host device and causing an operational crash of the adaptive filter. On the other hand, relatively simple algorithms do not pose a substantial risk of this sort, but at the expense of providing suboptimal quality of echo suppression.

Adaptive filter 300 addresses these problems because it can select and/or change the algorithm and/or algorithm species based on the available MIPS budget. More specifically, selector module 340 receives, as one of its input signals, signal $B_n$, which informs the selector module about the MIPS budget that the host device is currently able to allocate to adaptive filter 300. Based on signal $B_n$, selector module 340 configures algorithm module 350, e.g., using variable ID in control signal 348, to select and run an appropriate procedure 352 that, while supporting a relatively high quality of echo suppression, carries a relatively low risk of overwhelming the computational resources. Selector module 340 is configured to monitor changes in the available MIPS budget and, if appropriate or necessary, instruct algorithm module 350 to switch to a different procedure 352 to insure that the risk of operational crash of adaptive filter 300 remains relatively low (e.g., below a specified threshold value) while optimal (for the available MIPS budget) quality of echo suppression is being maintained.

Each procedure 352 in algorithm module 350 is generally characterized by a well-defined MIPS cap. As a result, selector module 340 can identify procedure 352 whose MIPS cap comes closest to the available MIPS budget, without exceeding it. Hereafter, this procedure is referred to as an "optimal-MIPS procedure." As the MIPS budget fluctuates, so does the identity of the optimal-MIPS procedure. For achieving optimal quality of echo suppression, it is desirable to have algorithm module 350 running optimal-MIPS procedures as large a fraction of the time as possible. However, practical limitations on the implementation of transitions between different procedures 352 and the MIPS overhead of each of such transitions impose an upper limit on the rate at which transitions between procedures 352 remain beneficial in terms of the quality of echo suppression. In general, for each particular set of algorithm species implemented in algorithm module 350 and the corresponding structure of enabled transitions between different procedures 352, there is a cutoff frequency, whereat more-frequent transitions are no longer beneficial.

In one configuration, the host device refreshes signal $B_n$ less frequently than the refresh rate corresponding to the cutoff frequency. Since adaptive filter 300 generally does not switch procedures 352 more frequently than the refresh rate, the switch rate is automatically below the rate corresponding to the cutoff frequency. In an alternative configuration, the host device refreshes signal $B_n$ every clock cycle, but adaptive filter 300 reads signal $B_n$ at a rate that is below the rate corresponding to the cutoff frequency. In yet another configuration, the host device refreshes signal $B_n$ every clock cycle, but adaptive filter 300 averages signal $B_n$ over a period of time and supplies averaged values of the MIPS budget to selector module 340 at a rate that is below the rate corresponding to the cutoff frequency. In a typical configuration, selector module 340 might receive an update of the MIPS budget several times per second or about once per speech frame.

In one configuration, signal $B_n$ originates from a task manager residing in the media gateway of the host device. Since the task manager "knows" the overall system load and resource allocation, it can generate signal $B_n$ by provisionally allocating at least a portion of the available processing capacity to adaptive filter 300. If adaptive filter 300 is one of a plurality of such adaptive filters, then the task manager generates multiple signals $B_n$, each intended for a respective one of adaptive filters 300.

In addition to signal $B_n$, selector module 340 receives several other input signals that are used therein to appropriately generate control signal 348. For example, one of the input signals received by selector module 340 specifies a preferred number of taps, $L_0$, for adaptive filter 300. If the MIPS budget permits, then selector module 340 passes that preferred number onto algorithm module 350. However, if the MIPS budget is relatively tight, then selector module 340 can reduce the number of taps and configure algorithm module 350 to run one of the algorithm species characterized by the number of taps $L<L_0$.

Another one of the input signals received by selector module 340 specifies preferred parameter values for initialization of various procedures 352 in algorithm module 350. In FIG. 3, this input signal is labeled as constant set $\overline{p_0}$. If some of procedures 352 are based on a fast affine projection (FAP) algorithm, then constant set $\overline{p_0}$ contains the preferred initial values of (i) scalar regularization parameter $\delta_0$ for the sample autocorrelation matrix and (ii) step-size parameter $\mu_0$. A more-detailed explanation of these parameters is given, e.g., in the original FAP article by S. L. Gay and S. Tavathia entitled "The Fast Affine Projection Algorithm," published in the Proceedings of the International Conference on Acoustics, Speech, and Signal Processing (ICASSP), Detroit, Mich., USA, May 1995, pp. 3023-26, which article is incorporated herein by reference in its entirety. Selector module 340 can use constant set $\overline{p_0}$, e.g., to generate set $\tilde{D}_n$ for control signal 348.

In one embodiment, either selector module 340 or algorithm module 350, or both, execute one or more monitoring procedures (not explicitly shown in FIG. 3) that detect situations in which error accumulation in the currently active procedure 352 begins to approach a critical level, thereby threatening to cause a catastrophic divergence of that procedure crash in adaptive filter 300. Selector module 340 uses input signal $x_n$ and/or output signal $e_n$ to provide input data for the monitoring procedure(s) implemented at the selector module. Algorithm module 350 uses an alarm signal to forewarn selector module 340 about critical error accumulation detected by the monitoring procedure(s) implemented at the algorithm module. Based on the warnings generated by the monitoring procedure(s), selector module 340 can instruct algorithm module 350 to switch to a different procedure 352 or to implement a safe restart of the currently active procedure 352. Because a warning is generated when the internal data and parameters of the currently active procedure 352 are not yet significantly injured by the error accumulation, a relatively large amount of those data and parameters can be recycled, thereby saving substantial computational resources that would otherwise be required to recalculate the same. After a successful iteration, algorithm module 350 uses a signal labeled $D_n$ to transfer the relevant internal algorithm data and parameters of the currently active procedure 352 to a rescue buffer in selector module 340. After a warning is generated, the saved data and parameters can be (i) retrieved from the rescue buffer, (ii) slightly modified, if appropriate or necessary, and (iii) returned, via control signal 348 (see variable $\tilde{D}_n$ in FIG. 3), back to algorithm module 350 for use in the restarted procedure 352.

Figure 4:
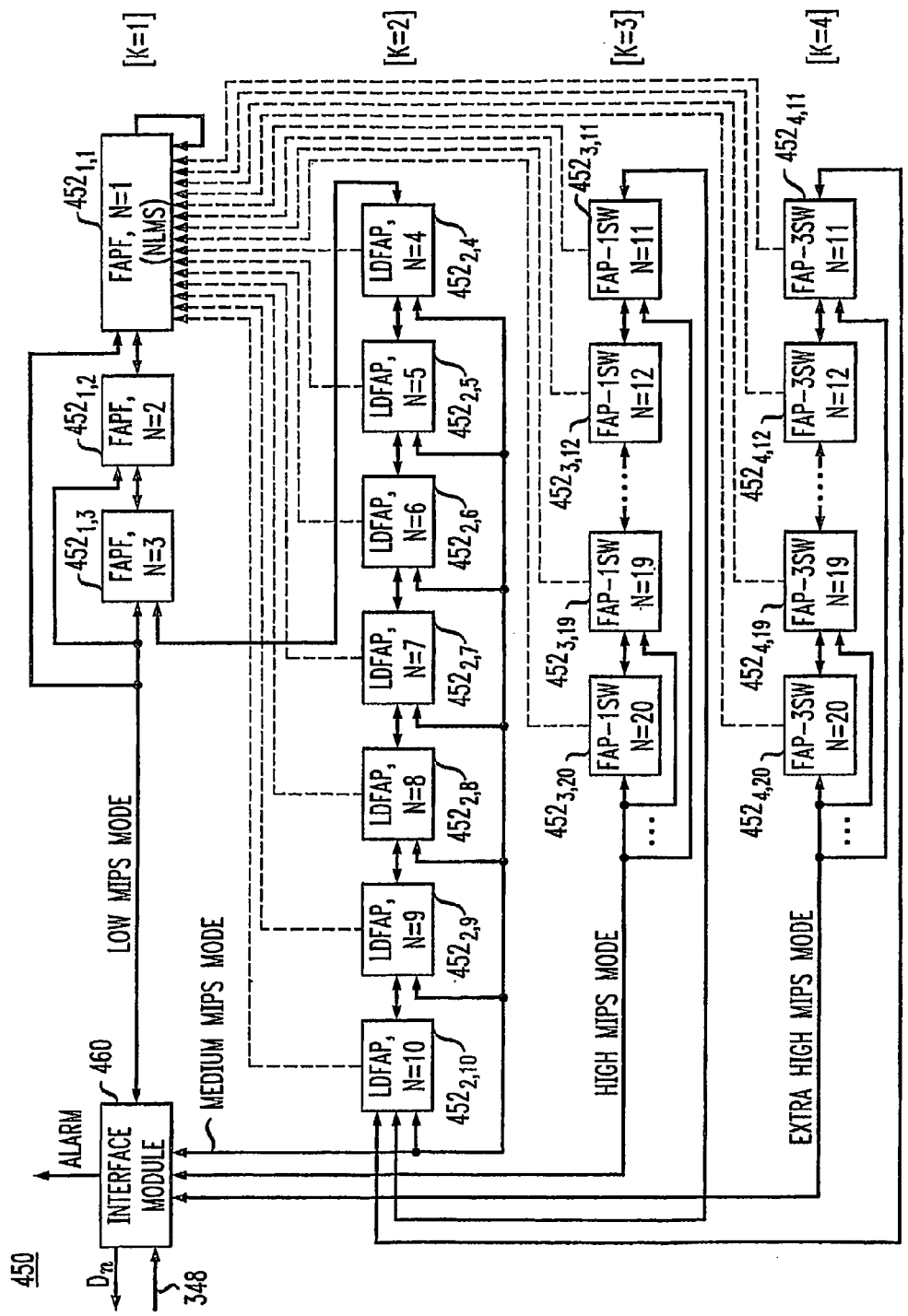
FIG. 4 shows a block diagram of an algorithm module that can be used in the adaptive filter of FIG. 3 according to one embodiment of the invention.

FIG. 4 shows a block diagram of an algorithm module 450 that can be used as algorithm module 350 according to one embodiment of the invention. Algorithm module 450 has thirty procedures $452_{K,N}$, where K is an index identifying an algorithm and N is the projection order. All procedures 452 use the same number of taps L. Therefore, the values of K and N unambiguously identify the corresponding algorithm species and can be used to define variable ID for signal 348 (see also FIG. 3).

Algorithm module 450 employs four different adaptive filtering algorithms identified by K=1, 2, 3, and 4, respectively. The first algorithm (K=1) is a fast affine projection filter (FAPF) algorithm disclosed, e.g., in U.S. Pat. No. 5,428,562, which is incorporated herein by reference in its entirety. Additional details on the FAPF algorithm can be found, e.g., in the above-cited article by S. L. Gay and S. Tavathia and in an article by M. Tanaka, et al., "Fast Projection Algorithm and Its Step Size Control," IEEE, 1995, pp. 945-948, which is incorporated herein by reference in its entirety. Note that, for N=1, the FAPF reduces to a conventional normalized least mean square (NLMS) algorithm (see procedure $452_{1,1}$ in FIG. 4).

The second algorithm (K=2) is a variant of FAP that is based on the Levinson-Durbin approximation of the autocorrelation matrix, often referred to as the Levinson-Durbin FAP (LDFAP) algorithm. The LDFAP algorithm is disclosed, e.g., in (i) U.S. Pat. No. 6,137,881; (ii) S. Oh, et al., "A Fast Affine Projection Algorithm for an Acoustic Echo Cancellation Using a Fixed-Point DSP Processor," Proc. ICASSP, April 1997, pp. 4121-4124; and (iii) H. Ding "Fast Affine Projection Adaptation Algorithms Featuring Stable Symmetric Positive-Definite Linear System Solvers," IEEE Transactions on Signal Processing, 2007, Vol. 55, No. 5, pp. 166-169, all of which are incorporated herein by reference in their entirety. In one embodiment, the second algorithm can be an improved variant of LDFAP based on reciprocating recursion with prefixing and shifting, often referred to as Ratchet FAP, disclosed, e.g., in U.S. Patent Application Publication No. 2006/0039458, which is also incorporated herein by reference in its entirety.

The third and fourth algorithms (K=3 and 4) are based on a variant of FAP that can employ up to three sliding windows in both filtering and FTF modules as described, e.g., in F. G. Resende, et al., "AR Spectral Estimation Based on Multi-Window Analysis of the Linear Prediction Error," IEEE, 1997, pp. 119-122, which is incorporated herein by reference in its entirety. The third algorithm (K=3) employs one sliding window in the FTF module and is designated as FAP-1SW. The fourth algorithm (K=4) employs three sliding windows in the FTF module and is designated as FAP-3SW.

The above-specified selection of algorithms for algorithm module 450 can be briefly justified as follows. The most-prevalent algorithm used in adaptive filtering is the NLMS. Unfortunately, the NLMS algorithm has a relatively low convergence speed. Two algorithms that are often used as alternatives to the NLMS algorithm are the affine projection algorithm (APA) and the recursive least mean squares (RLS) algorithm. However, the APA algorithm is computationally expensive (i.e., requires a relatively large MIPS budget), and the RLS is notorious for its quirky behavior. A FAP algorithm is a streamlined version of the APA algorithm that is similar in complexity to the NLMS algorithm, but having a significantly faster convergence speed. The above-indicated variants of FAP were selected for algorithm module 450 because they are capable of providing a substantially optimal quality of echo suppression and exhibit other advantageous characteristics. Herein, the term "substantially optimal quality of echo suppression" means a quality that is sufficiently close to the theoretically achievable quality for the given MIPS budget. One skilled in the art will appreciate that, in other embodiments, other numbers and/or combinations of algorithms can similarly be used.

In one embodiment, algorithm module 450 employs the FAPF, LDFAP, FAP-1SW, and FAP-3SW algorithms having the following respective modifications.

In the FAPF algorithm, the sliding-window fast-transversal-filter (SWFTF) method for solving a system of linear equations is replaced by a method using the so called "direct system-of-linear-equations solving." Herein, the term "direct solving" means that the solution is computed directly (as opposed to iteratively) using a known algebraic formula expressing said solution. In one implementation, the formula can be programmed by means of an ad-hoc routine optimized for matrices having a specific internal structure expected in this particular case.

In the LDFAP algorithm, the SWFTF method is replaced by a ratchet method (described, e.g., in the above-cited U.S. Patent Application Publication No. 2006/0039458) or by the Levinson-Durbin method of linear-equation solving (described, e.g., in the above-cited article by S. Oh, et al.). Regularization parameter $\delta$ is updated according to the following recursive formulas:

$$\delta_1 = \delta_0 \quad (1a)$$

$$\delta_n = \max\left(\delta_{n-1}, \frac{R_{isf}}{L} C\delta_0\right) \quad (1b)$$

where $\delta_0$ is the preferred initial value specified in constant set $\overline{p_0}$ (see also FIG. 3); C is a constant between about 500 and about 1000; $R_{isf}$ is the energy (or sound volume) of the last speech frame scaled to length L; and L is the number of taps.

In the FAP-1SW algorithm, the resident SWFTF algorithm is configured to work in a single-window mode. Mathematically, this approach is similar to constructing a gradient vector in a linear space of greater dimensionality and projecting it onto a linear space of lower dimensionality. For multiple sliding windows, multiple instances of the SWFTF algorithm might be running. In addition, the SWFTF algorithm is implemented so that 32-bit numbers are used for divisions/multiplications, 64-bit numbers are used for additions/subtractions, and normalization/de-normalization is used to provide conversion between additive and multiplicative numerical forms. The number of normalization/de-normalization operations is substantially minimized. In particular, normalization with the same multiplier is used for certain sets of data, such as forward- and backward-prediction-coefficients vectors and some temporary matrices computed within the SWFTF algorithm. This type of normalization, while significantly reducing the number of de-normalization operations, does not lead to significant losses in the convergence speed. In a fixed-point implementation, the representation accuracy of numbers within the SWFTF algorithm is uniform 64 bits for all operations, e.g., using the 0:19:45 format, which serves to minimize or completely eliminate restarts during the convergence period. Regularization parameter $\delta$ is updated based on a feedback from the SWFTF algorithm. The initial value of $\delta$, which is specified in an input to the algorithm, can be modified, e.g., in the range from about −80% to about +500%. For example, if the SWFTF algorithm diverges too fast, then the value of $\delta$ is increased. On the other hand, if the time spent between two consecutive SWFTF restarts is relatively large, then the value of $\delta$ is decreased.

In one configuration, selector module 340 sets the value of K for algorithm module 450 to 1, 2, 3, and 4 when the available MIPS budget specified by signal $B_n$ (see FIG. 3) is from 3 to 10, from 10 to 15, from 15 to 30, and from 30 to 50 MIPS, respectively. Each of these ranges is further subdivided into intervals, each corresponding to a particular value of N. For example, the MIPS range corresponding to K=1 is subdivided into three intervals corresponding to N=1, 2, and 3, respectively; the MIPS range corresponding to K=2 is subdivided into seven intervals corresponding to N=4, 5 . . . 10, respectively; etc. As a result, for each value of the MIPS budget, selector module 340 can identify a corresponding interval and specify a corresponding (K, N) pair, thereby identifying a corresponding algorithm species for algorithm module 450. Note that the above-specified MIPS-budget ranges correspond to an exemplary implementation of algorithm module 450 on a 40-bit fixed-point DSP having four parallel multiply-and-accumulate (MAC) operations per clock cycle, such as the StarCore SC3400 processor commercially available from StarCore LLC of Austin, Tex. One skilled in the art will appreciate that other implementations of algorithm module 450 might use other MIPS-budget ranges.

In one embodiment, algorithm module 450 performs transitions between different procedures 452 as follows. For a fixed K, algorithm module 450 can directly transition from procedure $452_{K,N}$ to procedure $452_{K,N+1}$ or to procedure $452_{K,N-1}$. If K needs to be changed, then algorithm module 450 supports only the following direct transitions: (a) between procedures $452_{1,3}$ and $452_{2,4}$; (b) between procedures $452_{2,10}$ and $452_{3,11}$; and (c) between procedures $452_{2,10}$ and $452_{4,11}$. Algorithm module 450 also supports direct transitions from any procedure $452_{K,N}$ to procedure $452_{1,1}$. A transition to procedure $452_{1,1}$ can be precipitated, for example, by an abrupt decrease in the available MIPS budget. Note that, in FIG. 4, bi-directional and unidirectional direct transitions are indicated by double-headed and single-headed arrows, respectively. Transitions in algorithm module 450 that differ from the above-enumerated direct transitions are performed indirectly, either using some combination of the supported direct transitions or via an interface module 460.

As used herein, the term "direct transition" means a reconfiguration of the algorithm module, during which a previously running (first) algorithm species is terminated and a different (second) algorithm species begins to run immediately after the termination, wherein at least a portion of internal algorithm data, such as the autocorrelation vector or matrix, forward- and backward-prediction-coefficients vectors, and de-correlation filter, from the first algorithm species is transferred for use in the second algorithm species. The term "indirect transition" means a reconfiguration of the algorithm module, during which a previously running (first) algorithm species is terminated and a different (second) algorithm species begins to run, wherein (i) the algorithm module runs at least one other (third) algorithm species after the termination of the first algorithm species and before the start of the second algorithm species or (ii) the second algorithm species is initialized using a default initialization procedure, without transferring any internal algorithm data from the first algorithm species for use in the second algorithm species.

For K=1 and 2, a direct transition from procedure $452_{K,N}$ to procedure $452_{K,N-1}$ includes: (i) shrinking the autocorrelation matrix, R, to size (N−1)×(N−1) by removing its last row and last column and (ii) reducing the lengths of error vector e, de-correlated error vector $\epsilon$, and de-correlation filter E to length (N−1) by removing their respective last elements. For a definition of these entities, the reader is referred to the above-cited references on FAPF and LDFAP. A direct transition from procedure $452_{K,N}$ to procedure $452_{K,N+1}$ includes: (i) enlarging the autocorrelation matrix, R, to size (N+1)×(N+1) matrix by directly calculating the missing autocorrelation values and (ii) increasing the lengths of error vector e, de-correlated error vector $\epsilon$, and de-correlation filter E to length (N+1) by padding each of them with a zero element.

For K=3 and 4, a direct transition from procedure $452_{K,N}$ to procedure $452_{K,N-1}$ includes: (i) shrinking the autocorrelation matrix, R, to size (N−1)×(N−1) by removing its last row and last column; (ii) reducing the lengths of error vector e, de-correlated error vector $\epsilon$, forward-prediction-coefficients vector a, and de-correlation filter E to length (N−1) by removing their last elements; and (iii) reducing the length of backward-prediction-coefficients vector b to length (N−1) by removing its first element. For a definition of these entities, the reader is referred to the above-cited references on FAP. A direct transition from procedure $452_{K,N}$ to procedure $452_{K,N+1}$ includes: (i) enlarging the autocorrelation matrix, R, to size (N+1)×(N+1) matrix by calculating the missing autocorrelation values; (ii) increasing the lengths of error vector e, de-correlated error vector $\epsilon$, forward-prediction-coefficients vector a, and de-correlation filter E to length (N+1) by padding with zeros; and (iii) increasing the length of backward-prediction-coefficients vector b to length (N+1) by inserting a zero before the first element.

In one embodiment, algorithm module 450 performs the following error-monitoring and soft-restart routines.

For K=1 and 2, algorithm module 450 compares, at each clock cycle, the value of $|\epsilon_0\sqrt{R_{lsf}}|$ with a first threshold value, where $\epsilon_0$ is the first component of de-correlated error vector $\epsilon$ and $R_{lsf}$ is the energy of the last speech frame scaled to length L. If the value of $|\epsilon_0\sqrt{R_{lsf}}|$ reaches or exceeds the first threshold value, then interface module 460 informs selector module 340, via the alarm signal (see also FIG. 3), that a restart of the currently active procedure or a change of the algorithm species needs to be performed. It has been empirically determined that this error-monitoring procedure works best if the first threshold value is selected from a range between about 0.1 and about 0.2.

Qualitatively, the value of $|\epsilon_0\sqrt{R_{lsf}}|$ can be viewed as a measure of an error signal. More specifically, the error signal is a difference between the echo signal produced by the echo path (e.g., unwanted signal $u_n$ in FIG. 1) and the estimated echo signal produced by the adaptive filter (e.g., echo estimate $y_n$ in FIG. 1). An exact metric of the error signal is provided by the modulus of de-correlated error vector $\epsilon$. In practice, a most-significant fraction of the error is captured by the first component ($\epsilon_0$) of vector $\epsilon$. Thus, the value of $|\epsilon_0\sqrt{R_{lsf}}|$ is essentially an easy-to-calculate estimate of the echo-cancellation error expressed as a fraction of the total sound volume (represented by $R_{lsf}$) in the outgoing communication signal. If this value exceeds the specified threshold value, then sound degradation due to the residual echo signal is deemed too detrimental and algorithm module 450 is prompted to take a corrective action.

If algorithm module 450 is instructed to restart a procedure, then the following steps are taken. The value of $\epsilon_0$ is set to zero. Components of forward-prediction-coefficients vector a are assigned the respective rescue values saved in a rescue buffer, wherein the rescue values are the component values corresponding to vector a used in the last successful iteration. The procedure is then restarted using the new values of $\epsilon_0$ and vector a.

For K=3 and 4, algorithm module 450 compares, at each clock cycle, the value of $|\alpha(a,R)a_0-1|$ with a second threshold value, where R is the autocorrelation vector, a is the forward-prediction-coefficients vector, $a_0$ is the first element of vector a, and $\alpha$ is the forward-prediction energy. If the value of $|\alpha(a,R)a_0-1|$ reaches or exceeds the second threshold value, then interface module 460 informs selector module 340, via the alarm signal (see also FIG. 3), that a restart of the currently active procedure or a change of the algorithm species needs to be performed. It has been empirically determined that this error-monitoring procedure works best if the second threshold value is selected from a range between about 0.1 and about 0.2. Although the restart criterion used for K=3 and 4 has a different mathematical form than that of the restart criterion used for K=1 and 2, qualitative physical interpretations of the two criteria are similar. The different mathematical forms of the two criteria are mostly due to the differences between the corresponding algorithms (e.g., LDFAP vs. FAP-1SW or FAP-3SW).

If algorithm module 450 is instructed to restart a procedure, then the following steps are taken. Relying on the fact that the error-monitoring routine provides an advance warning and the internal algorithm data (that have been previously saved in the rescue buffer) are not significantly damaged yet by the growing error, algorithm module 450 configures procedure 452 that is being restarted to use the internal algorithm data saved in the rescue buffer instead of the data produced by the SWFTF algorithm during the halted iteration. The appropriate conditioning of these data for the restarted procedure takes 2N additional multiplications during the first N clock cycles after the restart. More specifically, the restart routine uses autocorrelation vector R saved in the rescue buffer. The retrieved autocorrelation vector is in use after the restart for N clock cycles until the restarted procedure 452 generates a proper replacement of that vector. De-correlation filter E is re-initialized at the restart.

While this invention has been described with reference to illustrative embodiments, this description is not intended to be construed in a limiting sense. For example, MIPS intervals corresponding to different algorithm species (see, e.g., procedures 452 in FIG. 4) can be overlapping or non-overlapping. Various modifications of the described embodiments, as well as other embodiments of the invention, which are apparent to persons skilled in the art to which the invention pertains are deemed to lie within the principle and scope of the invention as expressed in the following claims.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. A device, comprising:
    an algorithm module having a plurality of algorithm species, each adapted to suppress echo in a communication signal; and
    a selector module operatively coupled to the algorithm module and adapted to:
        select a first algorithm species from said plurality based on an available computational budget;
        configure the algorithm module to run the first algorithm species to perform said echo suppression;
        detect a change in the available computational budget;
        select a second algorithm species from said plurality based on the detected change in the available computational budget; and
        reconfigure the algorithm module to run the second, instead of the first, algorithm species to perform said echo suppression, wherein:
            the first algorithm species has a first projection order;
            the second algorithm species has a second projection order different from the first projection order by a value of one, with both the first projection order and the second projection order being positive integers; and
        wherein the algorithm module is adapted to transfer at least a portion of internal algorithm data generated by the first algorithm species for use in the run of the second algorithm species.

2. The device of claim 1, wherein the internal algorithm data comprises at least one of: an autocorrelation vector or matrix, a forward-prediction-coefficients vector, a de-correlation filter, and a backward-prediction-coefficients vector.

3. The device of claim 1, wherein the plurality of algorithm species comprises at least two algorithm species whose projection orders differ by a value that is greater than one.

4. The device of claim 3, wherein a number of taps is fixed within said plurality of algorithm species.

5. The device invention of claim 1, wherein:
    the plurality of algorithm species comprises a normalized least mean square (NLMS) algorithm having a projection order of one;
    the selector module is further adapted to reconfigure the algorithm module to run the NLMS algorithm instead of the second algorithm species to perform said echo suppression, without running any other algorithm species of the plurality between the second algorithm species and the NLMS algorithm; and
    the second projection order is greater than two.

6. The device of claim 1, wherein:
    the second projection order is smaller than the first projection order; and
    to perform the transfer, the algorithm module is configured to perform one or more of the following:
        shrink an autocorrelation matrix generated by the first algorithm species by removing a row and a column from said autocorrelation matrix;
        reduce a length of an error vector generated by the first algorithm species by removing an element from said error vector;
        reduce a length of a forward-prediction-coefficients vector generated by the first algorithm species by removing an element from said forward-prediction-coefficients vector;
        reduce a length of a backward-prediction-coefficients vector generated by the first algorithm species by removing an element from said backward-prediction-coefficients vector;
        reduce a length of a de-correlated error vector generated by the first algorithm species by removing an element from said de-correlated error vector; and
        reduce a length of a de-correlation filter generated by the first algorithm species by removing an element from said de-correlation filter.

7. The device of claim 1, wherein:
    the second projection order is greater than the first projection order; and
    to perform the transfer, the algorithm module is configured to perform one or more of the following:
        enlarge an autocorrelation matrix generated by the first algorithm species by calculating missing autocorrelation values for an additional row and an additional column;
        increase a length of an error vector generated by the first algorithm species by padding said error vector with a zero element;
        increase a length of a forward-prediction-coefficients vector generated by the first algorithm species by padding said forward-prediction-coefficients vector with a zero element;
        increase a length of a backward-prediction-coefficients vector generated by the first algorithm species by padding said backward-prediction-coefficients vector with a zero element;

increase a length of a de-correlated error vector generated by the first algorithm species by padding said de-correlated error vector with a zero element; and increase a length of a de-correlation filter generated by the first algorithm species by padding said de-correlation filter with a zero element.

8. A method of adaptive filtering, comprising the steps of:

based on an available computational budget, selecting a first algorithm species from a plurality of algorithm species, each adapted to suppress echo in a communication signal of a communication device;

configuring the communication device to run the first algorithm species to perform said echo suppression;

detecting a change in the available computational budget;

selecting a second algorithm species from said plurality based on the detected change in the available computational budget; and reconfiguring the communication device to run the second, instead of the first, algorithm species to perform said echo suppression, wherein:

the first algorithm species has a first projection order;

the second algorithm species has a second projection order different from the first projection order by a value of one, with both the first projection order and the second projection order being positive integers; and the step of reconfiguring comprises transferring at least a portion of internal algorithm data generated by the first algorithm species for use in running the second algorithm species.

9. The method of claim 8, wherein the internal algorithm data comprises at least one of: an autocorrelation vector or matrix, a forward-prediction-coefficients vector, a de-correlation filter, and a backward-prediction-coefficients vector.

10. The method of claim 8, wherein the plurality of algorithm species comprises at least two algorithm species whose projection orders differ by a value that is greater than one.

11. The method of claim 8, wherein:

the second projection order is smaller than the first projection order; and the step of transferring comprises one or more of:

shrinking an autocorrelation matrix generated by the first algorithm species by removing a row and a column from said autocorrelation matrix;

reducing a length of an error vector generated by the first algorithm species by removing an element from said error vector;

reducing a length of a forward-prediction-coefficients vector generated by the first algorithm species by removing an element from said forward-prediction-coefficients vector;

reducing a length of a backward-prediction-coefficients vector generated by the first algorithm species by removing an element from said backward-prediction-coefficients vector;

reducing a length of a de-correlated error vector generated by the first algorithm species by removing an element from said de-correlated error vector; and reducing a length of a de-correlation filter generated by the first algorithm species by removing an element from said de-correlation filter.

12. The method of claim 8, wherein:

the second projection order is greater than the first projection order; and the step of transferring comprises one or more of:

enlarging an autocorrelation matrix generated by the first algorithm species by calculating missing autocorrelation values for an additional row and an additional column;

increasing a length of an error vector generated by the first algorithm species by padding said error vector with a zero element;

increasing a length of a forward-prediction-coefficients vector generated by the first algorithm species by padding said forward-prediction-coefficients vector with a zero element;

increasing a length of a backward-prediction-coefficients vector generated by the first algorithm species by padding said backward-prediction-coefficients vector with a zero element;

increasing a length of a de-correlated error vector generated by the first algorithm species by padding said de-correlated error vector with a zero element; and increasing a length of a de-correlation filter generated by the first algorithm species by padding said de-correlation filter with a zero element.

* * * * *